US006188462B1

(12) United States Patent
Lavrentovich et al.

(10) Patent No.: US 6,188,462 B1
(45) Date of Patent: *Feb. 13, 2001

(54) DIFFRACTION GRATING WITH ELECTRICALLY CONTROLLED PERIODICITY

(75) Inventors: Oleg D. Lavrentovich; Darius Subacius, both of Kent, OH (US)

(73) Assignee: Kent State University, Kent, MI (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/145,506

(22) Filed: Sep. 2, 1998

(51) Int. Cl.$^7$ .............................. G02F 1/133; G02F 1/137
(52) U.S. Cl. ............................ 349/201; 349/33; 349/175
(58) Field of Search .................................. 349/177, 179, 349/201, 175, 202, 132, 136, 33, 34, 35; 359/569, 573, 575

(56) References Cited

U.S. PATENT DOCUMENTS

| 3,843,231 | * | 10/1974 | Borel et al. | 349/202 |
| 5,638,201 | * | 6/1997 | Bos et al. | 349/129 |
| 5,883,687 | * | 3/1999 | Lu et al. | 349/201 |

OTHER PUBLICATIONS

"Cholesteric Gratings with field–controlled period" by Subacius et al.; Appl. Phys. Lett. 71(23), Dec. 8, 1997, pp. 3323–3325.

"Switchable diffractive cholesteric gratings" by Subacius et al.; Appl. Phys. Lett. 71 (10), Sep. 8, 1997, pp. 1350–1352.
"Polarization modulations of a nematic liquid crystal grating" by He et al.; SPIE vol. 2873, pp. 328–331.
"Cholesteric liquid crystal based beam steering device" by Tripathi et al.; Mol. Cryst. Liq. Cryst. vol. 301, 1997, pp. 289–294.
"Voltage–dependent optical activity of a twisted nematic liquid crystal" by Schadt et al.; Applied Physics Letters vol. 18, No. 4, Feb. 15, 1971, pp. 127–128.
"Advances in high speed nematic liquid crystal modulators" by Wu et al.; SPIE vol. 1665 Liquid Crystal Materials, Devices, and Applications, 1992, pp. 250–258.
"Vanishing Freedericksz transitions voltage in a chiral nematic liquid crystal" byCrandall et al.; Appl. Phys. Lett. 64(13) Mar. 28, 1994, pp. 1741–1743.
"40.1: Cholesteric Liquid Crystal/Polymer Gel Dispersion: Reflective Display Application" by Yang et al.; SID Technical Paper Digest, vol. 23, May 1992, pp. 759–761.
"Calcul de la distorsion d'une structure cholesterique par un champ magnetique" by P.G. De Gennes; Solid State communications, vol. 6, 1968, pp. 163–165.

(List continued on next page.)

Primary Examiner—William L. Sikes
Assistant Examiner—Tai V. Duong
(74) Attorney, Agent, or Firm—Renner, Kenner, Greive, Bobak, Taylor & Weber

(57) ABSTRACT

The present invention is directed to liquid crystal diffraction gratings with electrically controlled periodicity. An electrical field is applied to liquid crystal device wherein the liquid crystals align to form a diffraction grating. The period of the diffraction grating is varied by changing the applied electrical field. The diffraction grating therefore has a period that can be varied by an electrical field.

12 Claims, 10 Drawing Sheets

OTHER PUBLICATIONS

"Electric–Field–Induced Color Changes and Pitch Dilation in Cholesteric Liquid Crystals" by Frederic J. Kahn; Physical Review Letters, vol. 24, No. 5, Feb. 5, 1970, pp. 209–212.

"Periodic Perturbations in the Cholesteric Plane Texture" by Gerristman et al.; Phys. lett. 37A, (1971), pp. 47–48.

"Instability of Cholesteric Liquid Crystals in an Electric Field" by Chigrinov et al.; Sov. Phys. JETP 50(5), Nov. 1979, pp. 994–999.

"On The Structure Of The Liquid Crystalline State Of Cholesterol Derivatives" by Sackman et al.; Journal of the American Chemical Society, 90:13, Jun. 19, 1968, pp. 3567–3569.

"Light Scattering Characteristics In Nematic–Cholesteric Mixtures With Positive Dielectric Anisotropy" by Kawachi et al., Japanese J. of Appl. Phys., vol. 17, No. 7, Jul. 1978, pp. 1245–1250.

"Electric–Field Controlled Color Effect in Cholesteric Liquid Crystals and Polymer–Dispersed Cholesteric Liquid Crystals" by Chilaya et al.; J. Appl. Phys. 80(3), 1970 (1996) pp. 1937–1939.

"Optical Waves In Crystals" by Yariv et al.; J. Wiley & Sons, Inc., New York 1984, pp. 347–358.

"Critical Behaviour Of The Cholesteric To Nematic Transition In An Electric Field" by Shiyanovskii et al.; Liquid Crystals, 1996, vol. 21, No. 5, pp. 645–650.

"Configurational transitions in cholesteric liquid crystals and their display applications" by Yang et al.; ALCOM Technical Reports, Nov. 1996, pp. 1–43.

* cited by examiner $E_z = 0$        $E_z = 0.8$ V/μm

US 6,188,462 B1

DIFFRACTION GRATING WITH ELECTRICALLY CONTROLLED PERIODICITY

The United States Government has a paid-up license in this invention and the right in limited circumstances to require the patent owner to license others on reasonable terms as provided for by the terms of Grant No. F49620-96-1-0449 awarded by BMDO/AFOSR and by the terms of Grant No. DMR 89-20147 awarded by the National Science Foundation.

FIELD OF THE INVENTION

The present invention is directed to diffraction gratings. More particularly, the present invention is directed to a liquid crystal diffraction grating with electrically controlled periodicity.

BACKGROUND OF THE INVENTION

A diffraction grating is a series of parallel fine lines, slits or grooves on a substrate that diffract light passing through the grating. The grating period is the number of lines per unit length.

Presently, diffraction gratings are mainly constructed from mechanical means. These gratings have a fixed grating period which limits the ability to modify the diffraction of a light beam.

It is possible for liquid crystals to diffract light. Diffraction occurs whenever the orientation of liquid crystal molecules, described by the liquid crystal director, is periodically modulated in space. Spatial modulation of the director implies spatial modulation of the effective refractive index so that the liquid crystal serves as the phase diffraction grating. Chiral liquid crystals, such as cholesteric liquid crystals, are well known examples of media with periodically modulated (twisted) director fields. The cholesteric liquid crystal can be formed by chiral molecules or can be obtained by adding chiral molecules to a non-chiral nematic liquid crystal matrix.

When the liquid crystal is confined between two flat transparent plates and the director modulations are in the plane of the bounding plates (cell wall structures), the diffraction is controlled by the light wavelength, $\lambda$, the grating periodicity, $\Lambda$, and the thickness, d, of the liquid crystal layer (which is the distance between the bounding plates). The condition $Q=(2\pi\lambda d)/n\Lambda^2$, where n is the spatially averaged refractive index of the diffractive medium, defines Raman-Nath(RN) and Bragg regimes of diffraction. A thick grating, with Q>1, corresponds to Bragg diffraction and can produce a strong diffraction maximum when the incident angle satisfies the phase-matching condition. A thin grating, with Q<1, corresponds to RN diffraction. For normal incidence, the directions of the diffraction orders, m (where m=0; ±1; ±2; ... ) are $\theta_m=\arcsin(m\lambda/\Lambda)$.

What is needed in the art is a diffraction grating that can be produced by a non-mechanical means, and in which the period of the diffraction grating can be changed by adjusting an electrical field.

It is therefore an object of the invention to provide a diffraction grating wherein the period of the diffraction grating is varied by an applied electric field.

It is another object of the invention to provide a diffraction grating with in-plane uniformity of the modulated cholesteric structure.

SUMMARY OF THE INVENTION

The present invention is directed to a diffraction grating with an electrical field controlled period comprising a cell with a first cell wall structure and a second cell wall structure with a cholesteric liquid crystal, and at least two electrodes disposed therebetween.

The present invention is also directed to a method of controlling the period of a diffraction grating with an electrical field comprising: providing a diffraction grating comprising a cell with a first cell wall structure and a second cell wall structure with a cholesteric liquid crystal, and at least two electrodes disposed therebetween; and applying a sufficient electrical field to the cell to place the cholesteric liquid crystal in a modulated state.

DETAILED DESCRIPTION OF THE INVENTION

Figure 1A:
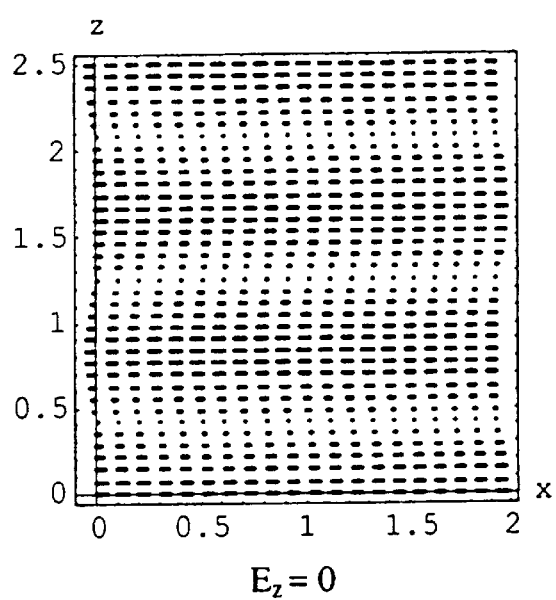
FIG. 1A is a computer simulated structure of a cholesteric liquid crystal shown in the Planar state with the applied voltage being zero volts.

The present invention is directed to a diffraction grating with an electrical field controlled period comprising a cell with a first cell wall structure and a second cell wall structure with a cholesteric liquid crystal, and at least two electrodes disposed therebetween.

The present invention is also directed to a method of controlling the period of a diffraction grating with an electrical field comprising: providing a diffraction grating comprising a cell with a first cell wall structure and a second cell wall structure with a cholesteric liquid crystal, and at least two electrodes disposed therebetween; and applying a sufficient electrical field to the cell to place the cholesteric liquid crystal in a modulated state.

The diffraction gratings of the present invention provide for in-plane modulations of the liquid crystal director that can be controlled by an applied electric or magnetic field. The applied electrical field can change the periodicity of modulations and thus change the direction of a diffracted beam. Preferably, the modulations of the director should be uniform in the plane of the cell.

The first and second cell wall structures can be any transparent material, for example, glass plates. Also, one of the cell wall structures can be non-transparent. When one of the cell wall structures is non-transparent, the diffraction grating can be used in a reflection mode.

Any cholesteric liquid crystal can be used with the present invention. The cholesteric liquid crystal can be formed from chiral molecules, or from an admixture of chiral molecules with non-chiral liquid crystals such as nematic liquid crystals.

The electrodes are any electrical conducting electrodes. An example of a suitable electrode is an Indium Tin Oxide (ITO) electrode. The electrodes are coated with a material such as a polymer such as a polyimide, polyvinyl alcohol, any polymer that does not interfere with the present invention, and mixtures thereof. The material on the electrode is aligned unidirectionally by any means that provide unidirectional alignment such as rubbing or photoalignment with polarized light. The alignment provides a uniform easy axis of molecular orientation.

The easy axis is the direction of preferred orientation of liquid crystal molecules which is set by anisotropic interactions between the liquid crystal and the first and second cell wall structures (the bounding plates/substrates). The easy axis should be either parallel to the bounding plates or be tilted with respect to the bounding plates; it should not be strictly perpendicular to the bounding plates. In other words, there should be non-zero projection of the easy direction onto the plane of the bounding plates. This in-plane component of the easy direction provides for uniform alignment of the director modulations in the plane of the cell.

The in-plane director modulations are caused by the electric field applied normally to the parallel bounding plates. The uniformity of the in-plane modulated structure is set by the surface easy axis. The uniform modulated state is needed to achieve the diffraction effect with a well defined direction of diffraction; whereas, modulations in flat supertwist nematic display cells are undesired. Wedge-shaped samples are undesired because the modulations are not uniform.

The voltage required for the applied electrical field depends on the pitch of the cholesteric liquid crystal and the thickness of the diffraction grating. For each cell design, the voltage required will be optimized to obtain the results of the present invention.

In the diffraction grating of the present invention, the initial field-free state is a planar P state in which the helix axis of the cholesteric structure is perpendicular to the cell walls. When an electrical field is applied, the dielectric coupling of the cholesteric structure creates an in-plane modulated M state. The uniformity and orientation of the modulated diffraction pattern is set by surface anchoring that provides unidirectional orientation at both first and second cell wall structures. Periodic in-plane modulation of the refractive index results in optical diffraction. The M state can be switched back into the P state at low voltages, or into a homeotropic H state at high voltages. In the H state, the director is normal to the cell walls and there is no diffraction.

The following parameters are considered when optimizing the design of the cell. The in-plane orientation of modulations strongly depends on the angle γ between the rubbing directions of the two cell walls of the device and the ratio d/p, where d is cell thickness and p is the equilibrium cholesteric pitch. For a cell with γ=90°, the stripes make an angle 45° or 135° with one of the rubbing directions, depending on the d/p ratio. For γ=0°, the stripes can be oriented parallel or perpendicular to the rubbing direction.

SPECIFIC EMBODIMENTS OF THE INVENTION

The following examples are not intended to limit the scope of this invention, as they are intended to be illustrative only.

EXAMPLE 1

A cholesteric material was obtained by doping a nematic liquid crystal, E7 from EM industries, Inc., having positive dielectric anisotropy $\Delta\varepsilon=13.8$ at voltage frequency f=1 kHz, refractive indices $n_o=1.522$, $n_e=1.746$ at 20° C., with a chiral agent, CB15 from EM Industries, Inc. The chiral mixture was disposed between two glass plates with ITO electrodes. The electrodes were coated with a polyimide, SE-610 from Nissan Chem., Inc., and were rubbed unidirectional to provide an in-plane easy axis of molecular orientation. The unidirectionally rubbing caused surface anchoring of the cholesteric material that provided for uniformity of modulations in the plane of the cell with the modulations caused by an applied electrical field.

Described herein are two cells with different weight concentration, c, of the chiral additive thus giving different equilibrium pitch, p, of the cholesteric bulk. Cell number 1: c=17%, p=0.7 μm, cell thickness (measured by interference technique) d=2.3±0.1 μm. Cell number2: c=8.1%, p=1.7 μm, d=2.3±0.1 μm.

Figure 2A:
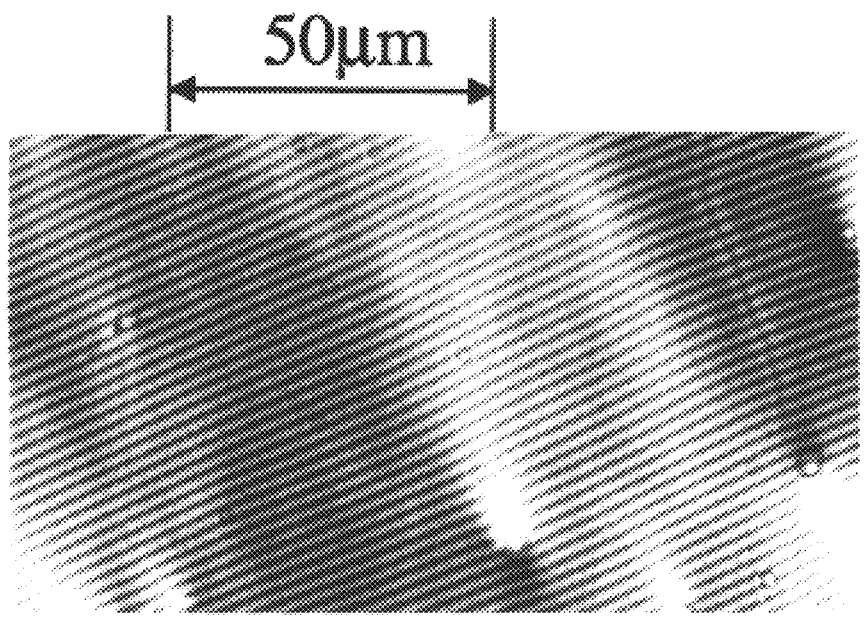
FIG. 2A is photograph of the texture of the liquid crystal in the Modulated state with the applied voltage being 1.1 volts.
Figure 2B:
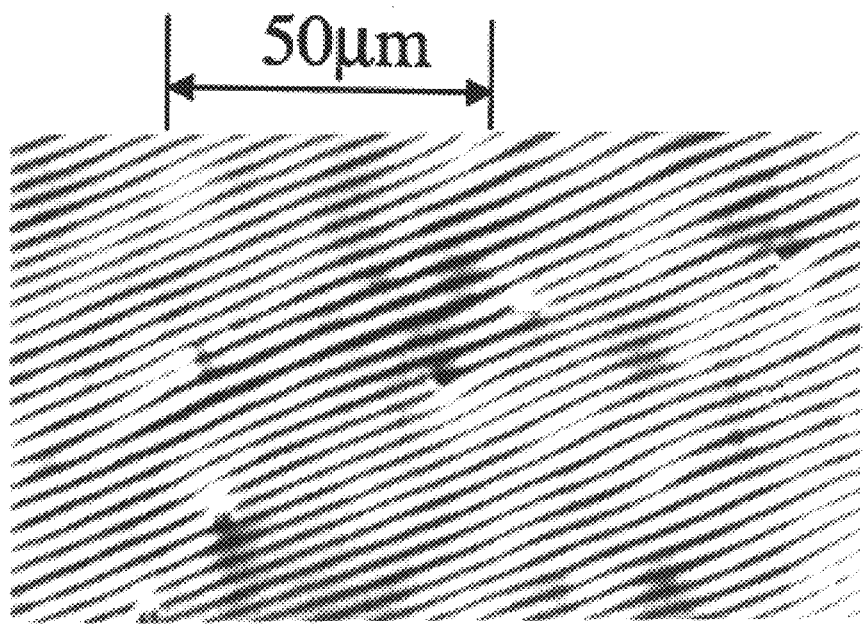
FIG. 2B is a photomicrograph of the texture of the liquid crystal in the Modulated state with the applied voltage being 1.75 volts.

The zero-field state was a planar (P) state with the cholesteric layers and molecules parallel to the cell walls, FIG. 1A. High-voltage, U, ac sin waves at f=1 kHz, with U>3.4V for cell No. 1 and with U>2.5V for cell No. 2) gave rise to a homeotropic (H) state with molecules normal to the cell walls. By increasing the voltage applied to the P state or by decreasing the voltage applied to the H state, an M state modulated in the plane of the cell was obtained, FIG. 1A, 2A, 2B. The period of modulations depended on the applied field, FIGS. 2A, 2B and 3B. The transition P-M was controlled by growth of oily streaks with cholesteric layers forming U-turns. The H-M transition occurred by growth of individual stripes. Although, the hysteresis effects were evidently in place, both the field-increasing and field-decreasing transitions produced the M state with a field-controlled period, FIGS. 2A and 2B. For a naked eye, in the transmitted light, the M state had a uniform color that varied with the viewing angle and the voltage.

Figure 1B:
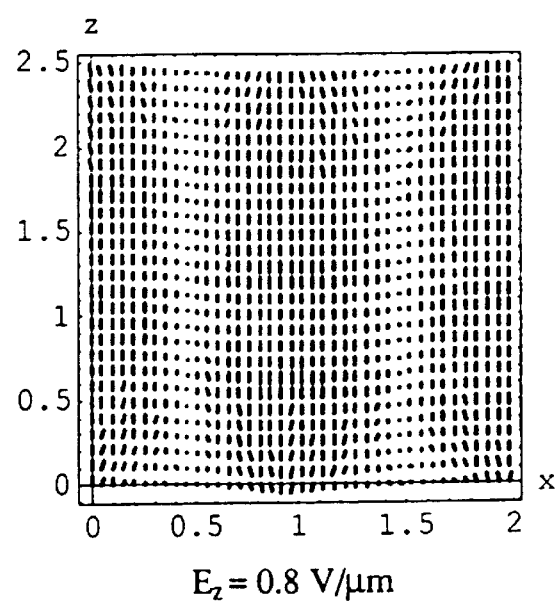
FIG. 1B, is a computer simulated structure of a cholesteric liquid crystal shown in the Modulated state with the applied voltage being two volts.

Both parameters p and d were important for proper design of the grating. When d/p is about 1 and p is about 5 μm, the period changed very little with the applied field. By raising the ratio d/p, the M grating with unique orientation and field-dependent period was obtained. Computer simulations based on Frank-Oseen elasticity with dielectric and Rapini-Papoular surface anchoring terms were used to approximate the M structure. FIG. 1B shows the simulated structure obtained for parameters close to that of cell No. 2. In the bulk, the structure remained helicoidal with slightly nonsinusoidal director twist because of the applied electrical field. Near the surfaces, three-dimensional distortions occurred.

A He—Ne laser (λ=633 nm), at room temperature, was used to study the light diffraction properties of the cells No. 1 and No. 2. Polarization of the incident light was set by a rotating polarizer. The cells were mounted on a rotating stage.

The M state is the polarization-sensitive phase diffraction grating; only the component of light polarized along the direction of the grating stripes is diffracted. The scattering plane is normal to this direction.

Cell No. 1 showed Bragg diffraction. With fixed λ=633 nm, the intensity of the diffracted beam depended on the angle of incidence and reached a maximum when the incident angle was equal to the Bragg angle. The diffraction angle, $\theta_d$, changed with U, the applied voltage, see Table 1.

TABLE 1

| θd (degrees) | U, Applied Electrical Field ($V_{rms}$) |
|---|---|
| 35.5° | 3.15 |
| 41° | 2.67 |
| 48.8° | 1.9 |

For each value of U, the incident angle was adjusted to satisfy the Bragg condition. The maximum efficiency of diffraction, calculated with respect to the incident light intensity, was about 0.3 and did not significantly change with a change in U. The diffraction corresponded to the basic period related to p/2, the actual period was higher than p/2. In addition, a much weaker, by two orders of magnitude, diffraction maximum related to a double period was also observed. This maximum was attributed to the symmetry-breaking effect of the bounding plates.

Figure 3A:
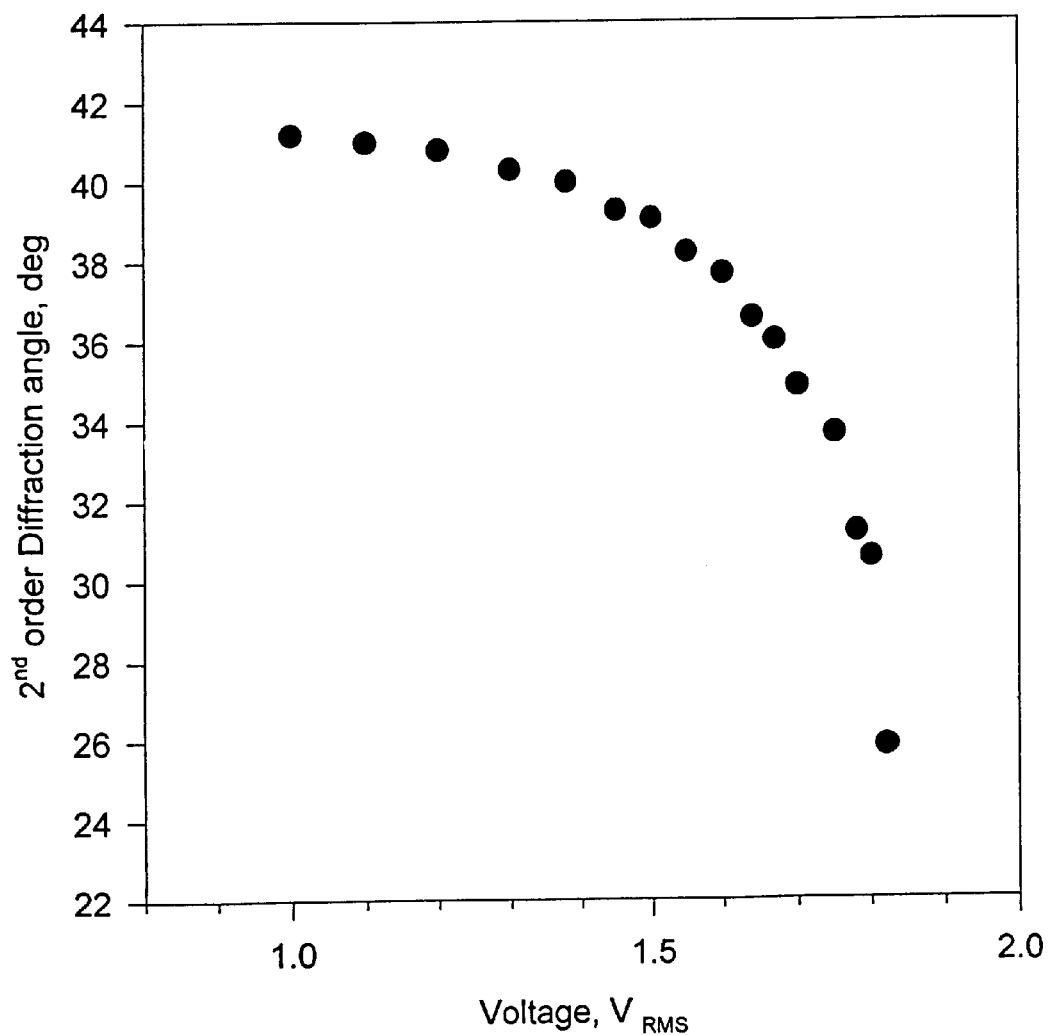
FIG. 3A is a graph of the diffraction angle of the second order diffraction maximum versus applied voltage.
Figure 3B:
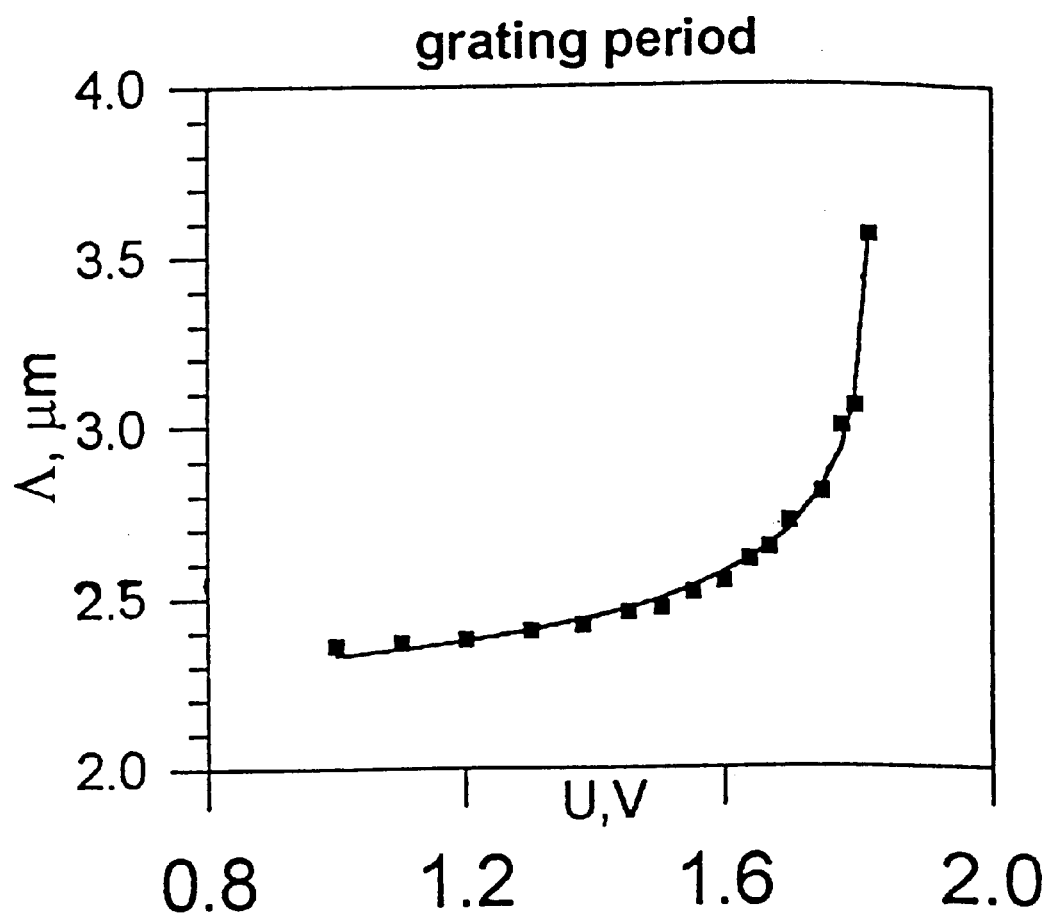
FIG. 3B is a graph of the grating period versus the applied voltage.

Cell No. 2 showed RN diffraction with visible 0, ±1, ±2, ±3 diffraction orders for a beam incident normally to the cell. FIGS. 3A and 3B show the voltage dependencies of the diffraction angle of the main maximum, second order, and grating period, Λ, that corresponds to the distance between the stripes in FIGS. 2A and 2B. The applied electric field dependence of Λ produced a beam steering effect; with the fixed incident beam, a variation of U resulted in continuous deflection of the diffracted beam, with an angular sector of about 20°.

Figure 4:
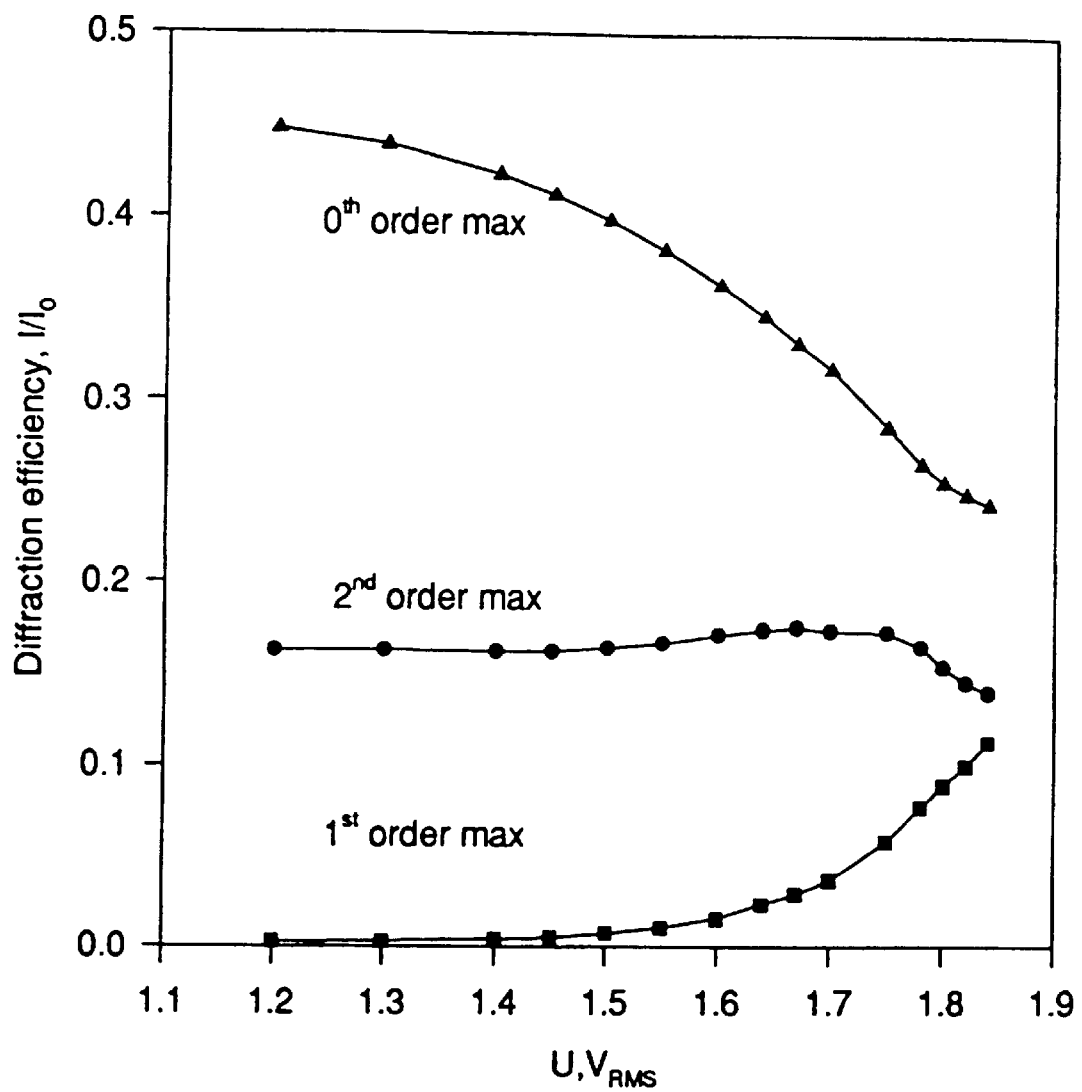
FIG. 4 is a graph of the intensities of the diffraction order maxima dependencies on the applied voltage.

FIG. 4 illustrates how the applied voltage changed the diffracted intensity for the zeroth-, first-, and second-order maxima. Near the M-H transition, the intensity of the first order maxima increased and became comparable with the intensity of the second-order maxima.

The time response of the M-H transition was of the order of about 10 ms. The M-P-M transitions were slower with M-P transitions of about 0.2s and with P-M transitions of about 2s.

The P-M transition and the variation of the period did not fit the Helfrich-Hurault model of field-induced layer undulations in the planar cell. Qualitatively, the period variation can be related to the phenomenon of field-induced unwinding of an ideal cholesteric helix. For an unbounded cholesteric, the pitch diverges as $$p \sim \sqrt{(4\pi K_{22}/\Delta\epsilon)}(1/U)\ln(1-(U/U_c)), \quad (1)$$

where $K_{22}$ is the twist elastic constant, U is the applied electric field, $U_c$ is the critical field of the cholesteric-nematic transition, and $\Delta\epsilon$ is the anisotropy of the liquid crystal. Equation (1) cannot be applied directly to the bounded structures; nevertheless, the equation provides a good fit to experimental data when the value of p is adjusted.

EXAMPLE 2

A liquid crystal cell was prepared. Walls of the cell were coated with polyimide (SE-610 supplied by Nissan Chem. Ind.) to provide a slightly tilted, 5°–10° with respect to the wall, director orientation. The polyimide layers were rubbed unidirectional to define an in-plane component of easy axis of the molecular orientation. Two types of cells were prepared a) γ=90° and 270° director twist; and b) with γ=0° and 360° director twist. The cells were filled with nematic liquid crystal LX ZLI 5200-000, supplied by E. Merck, having positive dielectric anisotropy Δ∈ of about 5.9 and refractive indices $n_o$ of about 1.494, for ordinary waves, and $n_e$ of about 1.614, for extraordinary waves, at 20° C. The nematic liquid crystal was doped with chiral agent CB 15, supplied by EM Industries. The cells were vacuum filled, and the thickness of the cell, d, is about 5–6 μm. To obtain an optimal grating pattern, the ratio of d/p was set at about 1.

Figure 5:
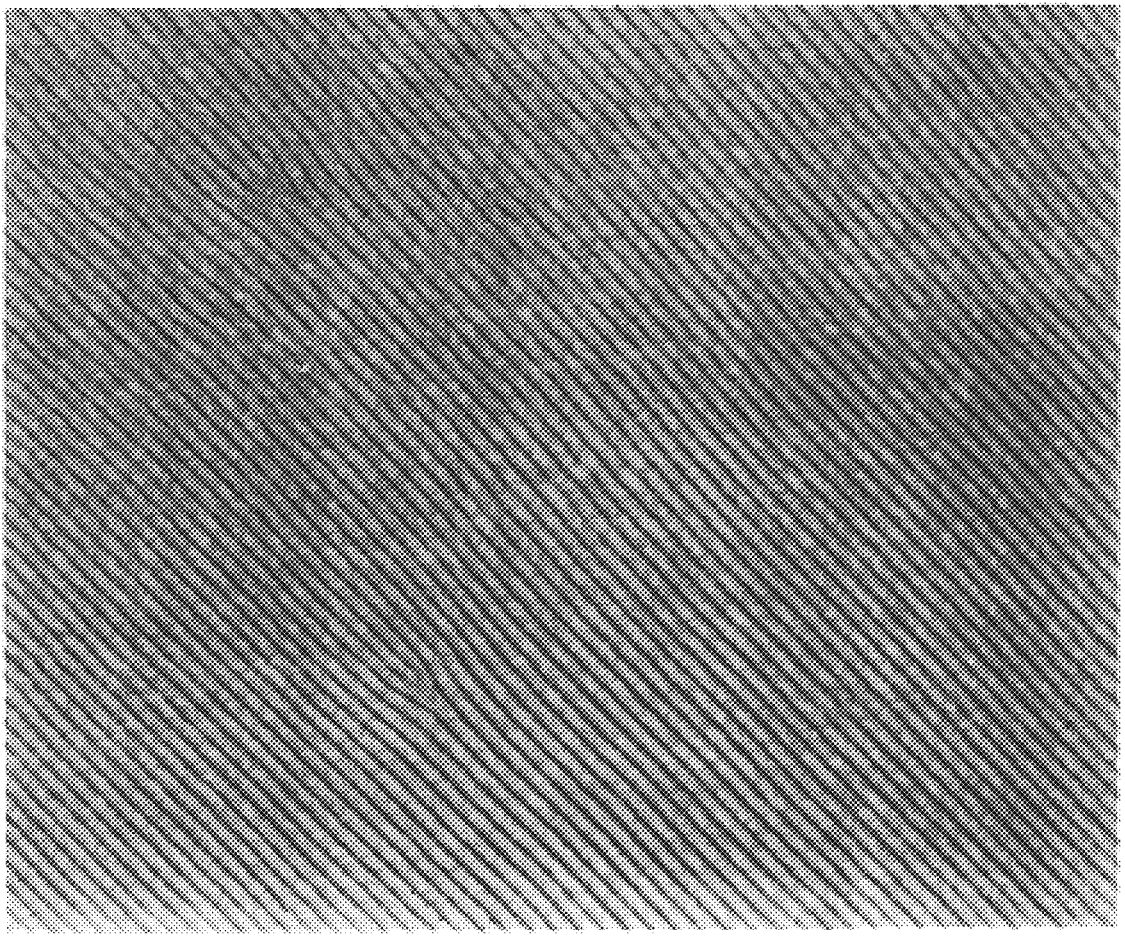
FIG. 5 is a photograph of the stripe domains in a 270° cell with applied voltage of 4.2 volts.

The initial structure of the cholesteric cell at U=0 V was planar, the P state, and the helix axis was oriented perpendicular to the cell walls. When an applied field, ac sin wave at voltage frequency f=1 kHz, exceeds the threshold voltage $U_c$ (amplitude $U_c$=3.9V for a cell with a 270° twist and d of about 5 μm), a periodic stripe pattern appeared in the plane of the sample, the M state, shown in FIG. 5. FIG. 5 is a photomicrograph of the stripe domains in a 270° cell at an applied voltage of 4.2V. The distance between two consecutive stripes is Λ/2=6.6 μm. Stripes were oriented at 45° from the rubbing direction for a 270° twist cell, and were oriented along the rubbing direction for a 360° twist cell.

The prepared cells were tested for diffraction using a He—Ne laser beam, wavelength λ=633 nm. The laser beam was directed through a linear polarizer, with the orientation controlled by Newport rotary stage 495 controller. The polarized laser beam was projected incident normally to the cell. The diffracted light intensity was measured by a photodetector for each of the different locations of diffraction maxima.

Figure 6:
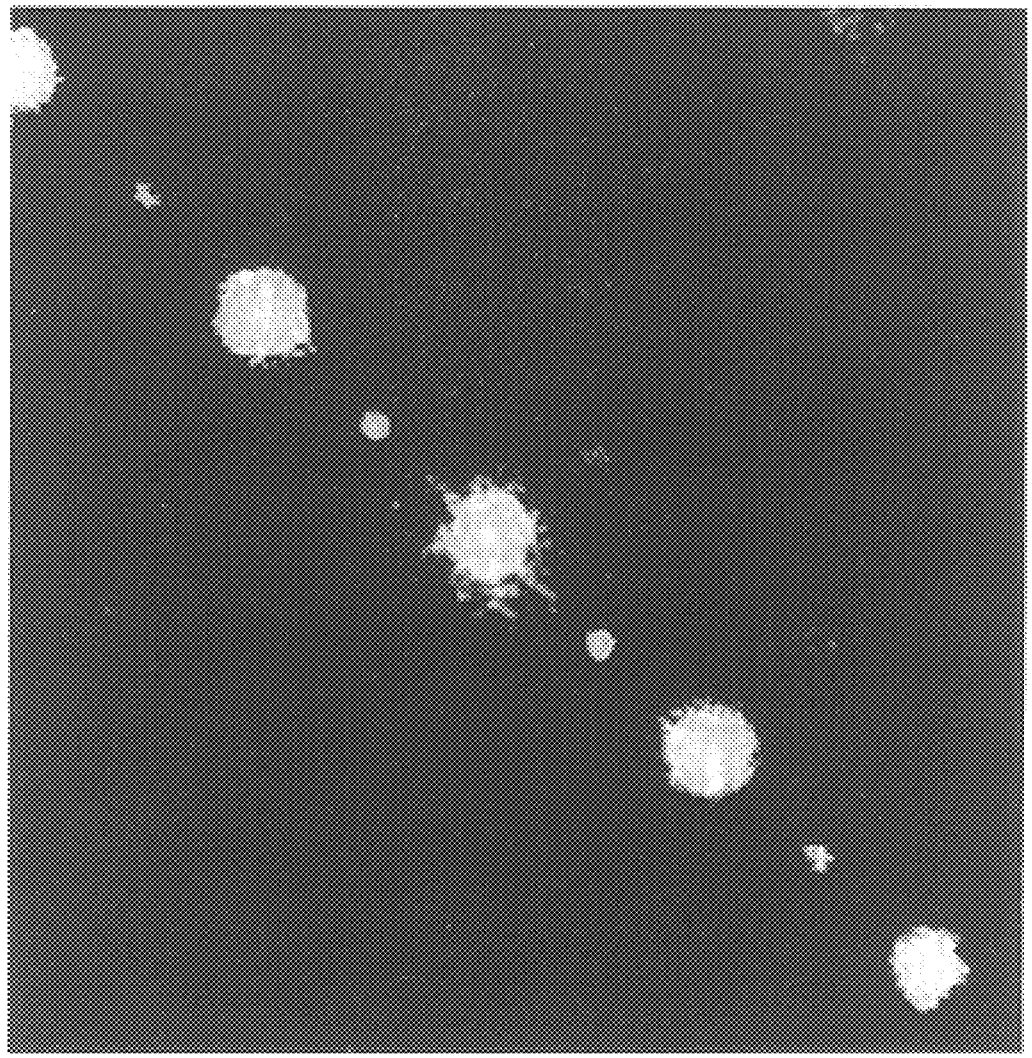
FIG. 6 is a photograph of the diffraction pattern of 270° cell at an applied voltage of 4.2 volts.
Figure 7:
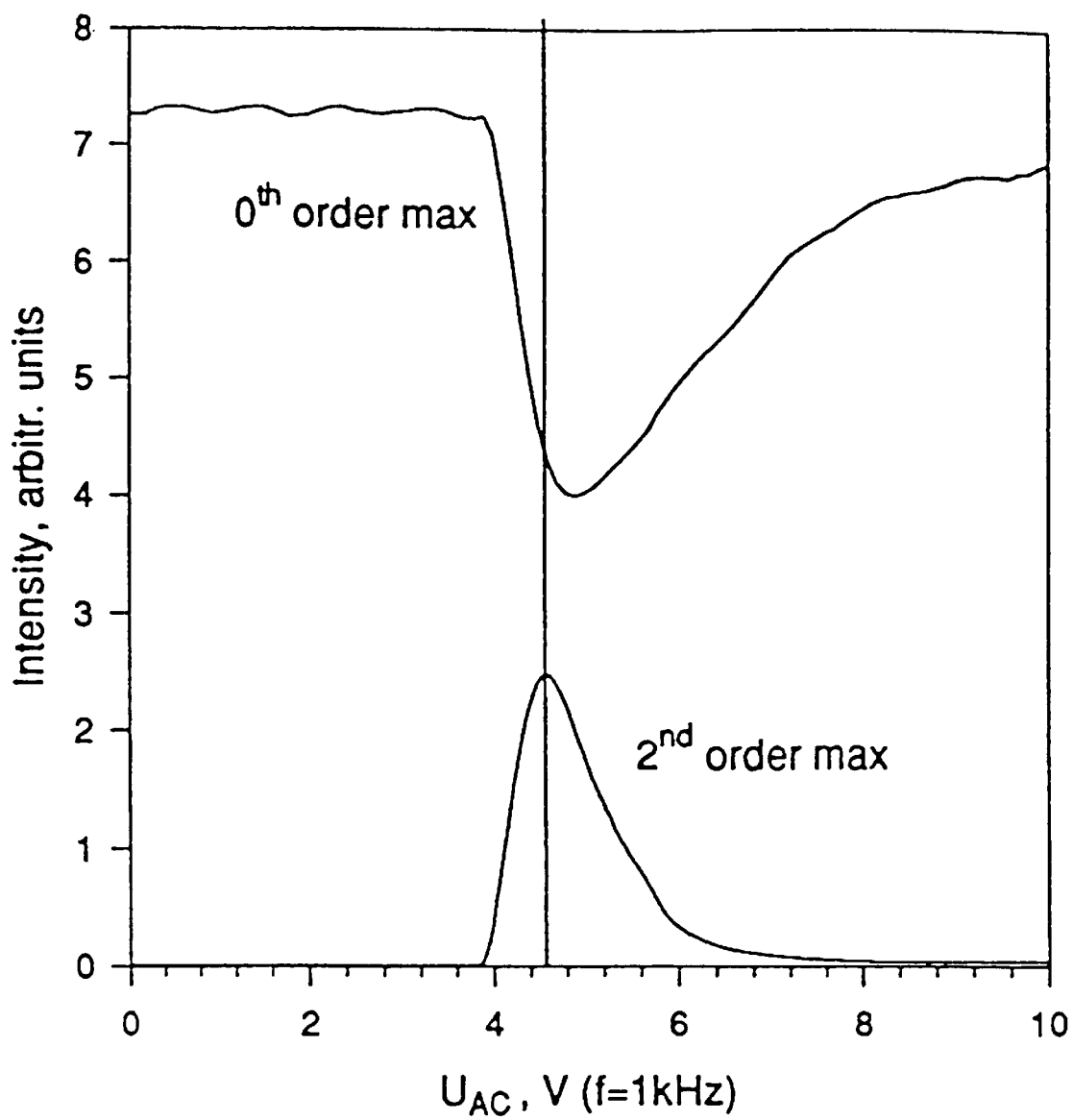
FIG. 7 is a graph of the voltage dependence of diffraction intensity for the zeroth and combined two second order maxima for a 270° cell.

An electric field greater than $U_c$ was applied to the cell and a diffraction pattern was produced. No analyzer was used. For the 270° twist cell at U=4.2V, the strongest maxima observed were the second order ones. The diffraction angle for the second order maximum was 5.5°. The first order maxima were 10–20 times weaker in intensity than the second order maxima. The diffraction pattern for the 270° twist cell is shown in FIG. 6. The voltage dependencies of the diffraction intensities for the zero and second two maxima are shown in FIG. 7. The voltage scan rate was +1 mV/s. Incident light was polarized along the rubbing direction of the front plate.

When the applied voltage was close to $U_c$, the higher order (3, 4, ...) maxima were not as intense and were more difficult to detect. Odd order diffraction maxima were weaker than even maxima, and the intensity of the odd order diffraction maxima depended on the angle of incidence.

In the region from $U_c$=3.9V to U of about 4.5V, the diffraction pattern was stable. A second mode of diffraction switching is the transition from the H state at high applied voltage, U≧10V, to the M state, 4V<U<4.4V. As in the case of P-M transition, the number of diffraction maxima depends on the voltage. At voltages close to 4V, there are only second order maxima and very weak first order maxima. At voltages closer to 4.4V, higher order maxima (3, 4, ...) appear as well. Odd order diffraction maxima are much weaker than the even ones.

The diffraction grating response was defined by measuring the intensity of the second maximum as a function of the applied electric field. Voltage steps of amplitude U=3.6V and offset voltage $U_{off}$=0.6V were applied to the cells. The growth and decay time Δt, measured when the intensity changes to 90% from the initial value, was approximately 20–30 ms. The theoretical relaxation time of the helical structure is estimated by the formula $\tau \approx \gamma_1 D^2/4\pi^2 K$, where D is the characteristic length of the system (in the present example D is approximately equal to d and approximately equal to p), $\gamma_1$ is the viscosity coefficient, K is an effective elastic constant. With $\gamma_1$ about 200 mPas, K about $10^{-11}$N, and D about 5 μm, τ is about 20 ms which is the same as the relaxation time of the helical structure of the liquid crystal.

Figure 8:
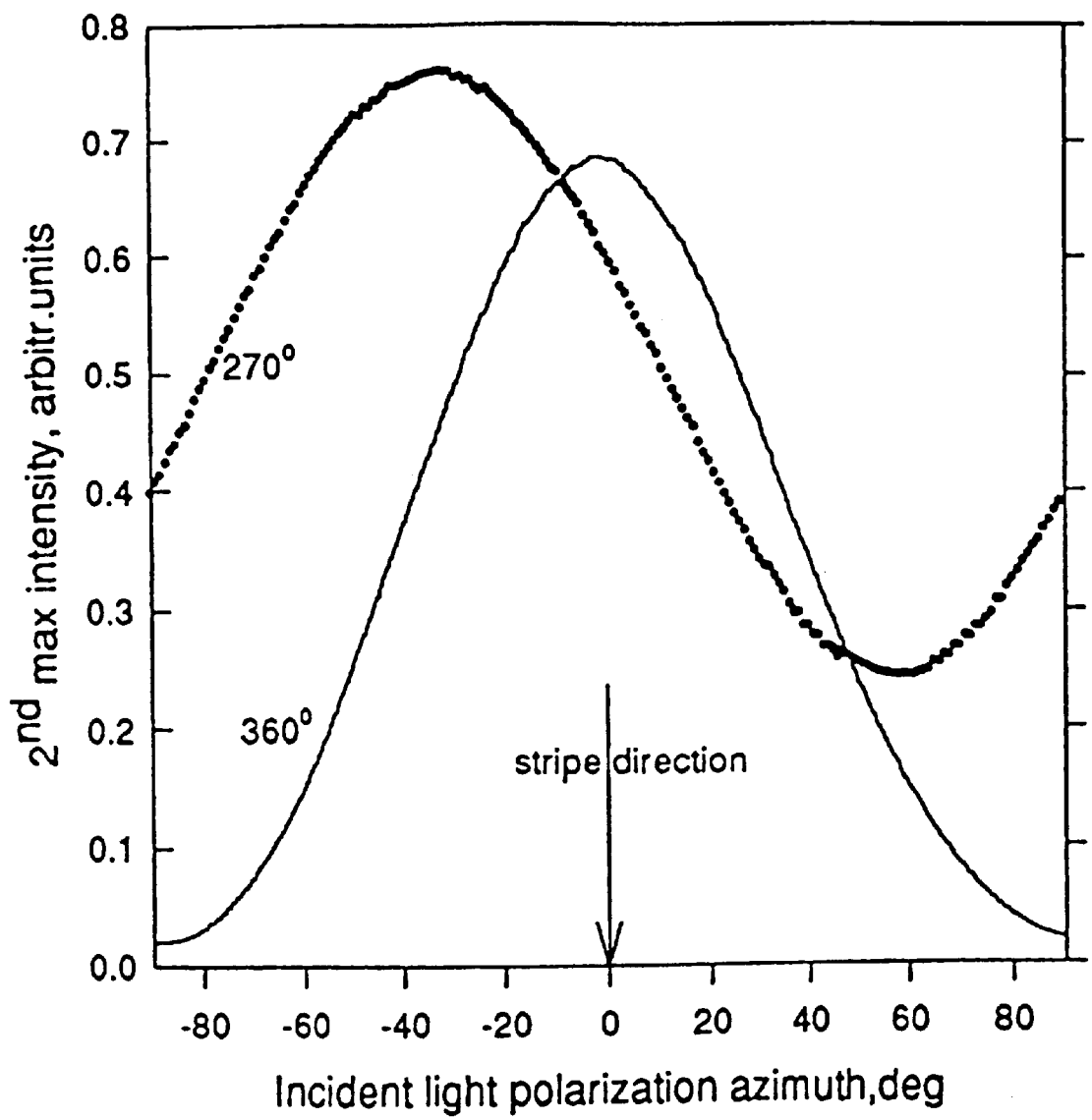
FIG. 8 is a graph of diffraction intensity dependence on the direction of the incident light polarization for a 270° and 360° cell at an applied voltage of 4.2 volts.
Figure 9:
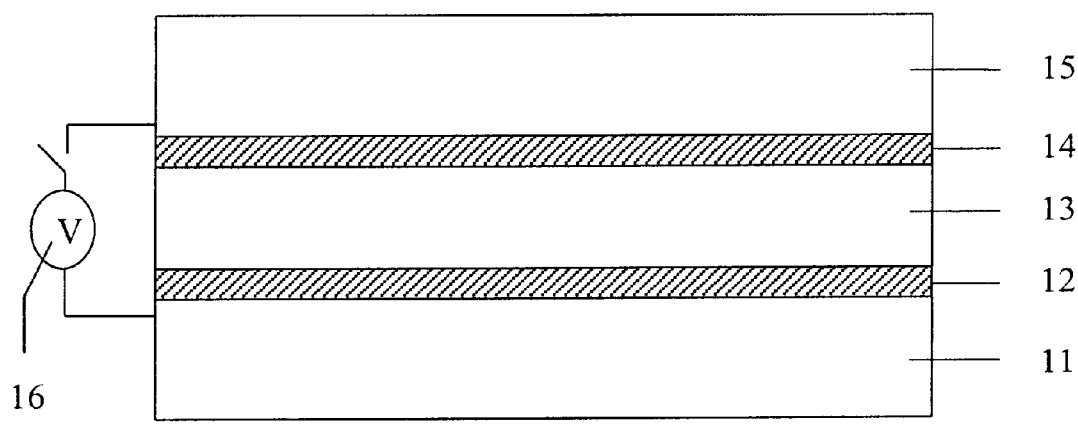
FIG. 9 is a schematic elevational view of a diffraction grating made according to an embodiment of the present invention with 11 and 15 being the electrodes and cell walls, 12 and 14 being the alignment layers, 13 being the liquid crystal, and 16 being the voltage source.

The diffraction efficiency depended on the direction of the incident light polarization. Results for the second order maximum for 270° and 360° twist cells are presented in FIG. 8. No analyzer was present. Polarizer orientation was measured with respect to the stripe orientation in the cell.

In a theoretically ideal cholesteric layer, for the polarization perpendicular to the helix axis, the refractive index is a periodic function of coordinate x along the helix axis. For the polarization along the x axis, the refractive index is $n=n_0$=constant. This cholesteric layer represents a polarization-sensitive phase grating with only the component of electric field vector that is perpendicular to the helix axis is diffracted. The diffraction condition is given in general by:

$$m\lambda = \Lambda \sin\theta,$$

where m is the diffraction order, θ is the corresponding diffraction angle, and Λ is the grating periodicity.

Two differences were noted between the observed diffraction pattern from the experiment in Example 2 and the prediction for a theoretically ideal cholesteric. First, the maximum efficiency of diffraction is not necessarily for the light that is polarized parallel to the stripes (see FIG. 8, the data for the 270° twist cell). This result indicates, that in the M state, there was still some director rotation between the plates that changes the state of light polarization. This rotation was controlled not only by the molecular twist and applied electric field, but was also controlled by the surface anchoring that should be taken into account for a theoretical model.

Second, in an theoretically ideal cholesteric, only even diffraction orders are predicted corresponding to the optical periodicity p/2. The directions θ=±5.5° of m=±2 maxima fit the equation $m\lambda = \Lambda \sin\theta$ with λ=633 nm and Λ=13.2 µm. Even diffraction orders correspond to the spatial harmonic with the periodicity Λ/2≈6.6 µm. This periodicity is the distance between two consecutive bright or dark stripes in FIG. 5. The dislocation structures with Burgers vector equal to Λ (FIG. 5) show that the real periodicity of stripes is Λ rather than Λ/2. This result is also supported by polarizational microscopy observation with a quarter wave plate. The interference colors were different for the ith and (i+1)th stripes, but were the same for ith and (i+2)th stripes. This shows that the in-plane director orientation in two consecutive stripes was different. Qualitatively, it can be described as the result of undulation of pseudonematic layers in the cell.

In the experiment, it was observed that higher order maxima were visible only when the applied voltage, U, is significantly greater than $U_c$. Without being limited by theory, it is theorized that the maxima are controlled by two mechanisms. First, additional spatial harmonics appear when the field increases. Second, the depth of optical modulation in the plane of the cell depends on the applied voltage, causing the change of the effective thickness (Δnd, where $\Delta n = n_e - n_0$) of the phase grating.

The polarization properties of the diffraction were a result of diffraction in the anisotropic phase grating with index ellipsoid variation in-plane and normal to the plane of the grating. The diffraction pattern and properties can be used to obtain the parameters of the spatial molecular orientation in the cell by assuming a director distribution model.

Thus, the objects of the invention are accomplished by the present invention, which is not limited to the specific embodiments described above, but which includes variations, modifications, and equivalent embodiments defined by the following claims.

What is claimed is:

1. A diffraction grating with an electrical field controlled period comprising a cell with a first cell wall structure and a second cell wall structure, electrodes disposed on facing surfaces of the first and second cell wall structures, a unidirectionally aligned alignment layer disposed on each electrode, and a cholesteric liquid crystal disposed between the first and second cell wall structures, wherein the alignment layer provides an in-plane easy axis of molecular orientation such that the easy axis is one of parallel or tilted with respect to the first and second cell wall structures, and wherein a combination of surface anchoring of the cholesteric liquid crystals on the alignment layer, molecular twist of the cholesteric liquid crystals, and orienting action of electric field sufficient enough to place the cholesteric liquid crystal in a modulated state with a director orientation modulated in the plane of the cell provides a uniform diffraction grating wherein the period is controlled by voltage of the electric field.

2. The diffraction grating of claim 1, wherein said cholesteric liquid crystal has positive dielectric anisotropy.

3. The diffraction grating of claim 1, wherein said cholesteric liquid crystal is formed from one of chiral molecules exclusively, and an admixture of chiral molecules mixed with non-chiral liquid crystals.

4. The diffraction grating of claim 1, wherein the alignment layer is formed by one of rubbing and photoalignment.

5. The diffraction grating of claim 1, wherein the alignment layer is a polymer selected from the group consisting of polyimides, polyvinyl alcohol, and mixtures thereof.

6. A method of controlling the period of a diffraction grating with an electrical field comprising:
   a. providing a diffraction grating with an electrical field controlled period comprising a cell with a first cell wall structure and a second cell wall structure, electrodes disposed on facing surfaces of the first and second cell wall structures, a unidirectionally aligned alignment layer disposed on each electrode, and a cholesteric liquid crystal disposed between the first and second cell wall structures, wherein the alignment layer provides an in-plane easy axis of molecular orientation such that the easy axis is one of parallel or tilted with respect to the first and second cell wall structures, and wherein a combination of surface anchoring of the cholesteric liquid crystals on the alignment layer, molecular twist of the cholesteric liquid crystals, and orienting action of the electric field sufficient enough to place the cholesteric liquid crystal in a modulated state with a director orientation modulated in the plane of the cell provides a uniform diffraction grating wherein the period is controlled by voltage of the electric field; and
   b. applying a sufficient electrical field to the cell to place the cholesteric liquid crystal in a modulated state.

7. The method of claim 6 wherein the applying sufficient electrical field comprises raising the voltage applied to the cell from where the cholesteric liquid crystal is in a planar state.

8. The method of claim 6, wherein the applying sufficient electrical field comprises reducing the voltage applied to the cell from where the cholesteric liquid crystal is in a homeotropic state.

9. The method of claim 6, wherein said cholesteric liquid crystal has positive dielectric anisotropy.

10. The method of claim 6, wherein said cholesteric liquid crystal is formed from one of chiral molecules exclusively, and an admixture of chiral molecules mixed with non-chiral liquid crystals.

11. The method of claim 6, wherein the alignment layer is formed by one of rubbing and photoalignment.

12. The method of claim 6, wherein the alignment layer is a polymer selected from the group consisting of polyimides, polyvinyl alcohol, and mixtures thereof.

* * * * *